United States Patent [19]

George et al.

[11] 4,162,431
[45] Jul. 24, 1979

[54] METHOD AND APPARATUS FOR CONTROLLING THE EROSION OF ARC PRODUCING ELECTRODES

[75] Inventors: Allen P. George, Norton; Harold Homer, Hartlepool; Christopher J. Richardson, Guisborough, all of England

[73] Assignee: Tioxide Group Limited, Billingham, England

[21] Appl. No.: 824,660

[22] Filed: Aug. 15, 1977

[30] Foreign Application Priority Data

Sep. 2, 1976 [GB] United Kingdom ............ 26502/76

[51] Int. Cl.² .................. H05B 41/16; H05H 1/26
[52] U.S. Cl. ........................ 315/346; 219/121 P; 313/153; 315/267; 315/338; 315/348
[58] Field of Search ............. 315/111.2, 111.4, 267, 315/338, 343, 344, 346, 348; 313/153, 154, 231.4; 219/121 P

[56] References Cited

U.S. PATENT DOCUMENTS

| 1,035,723 | 8/1912 | Naville et al. ............... 315/346 X |
| 3,283,205 | 11/1966 | Bolt .............................. 315/344 X |
| 3,828,223 | 8/1974 | New .............................. 315/267 |

FOREIGN PATENT DOCUMENTS 1300182 7/1969 Fed. Rep. of Germany.
966103 8/1964 United Kingdom.

*Primary Examiner*—Eugene R. La Roche
*Attorney, Agent, or Firm*—Schuyler, Birch, Swindler, McKie & Beckett

[57] ABSTRACT

Apparatus and process for reducing the rate of erosion of electrodes between which an arc is sustained by the provision of a field coil around the electrode which is supplied with direct current and the oscillation of that direct current supply at a frequency in the range $5 \times 10^{-1}$ to $1 \times 10^{-4}$ Hz.

12 Claims, 1 Drawing Figure

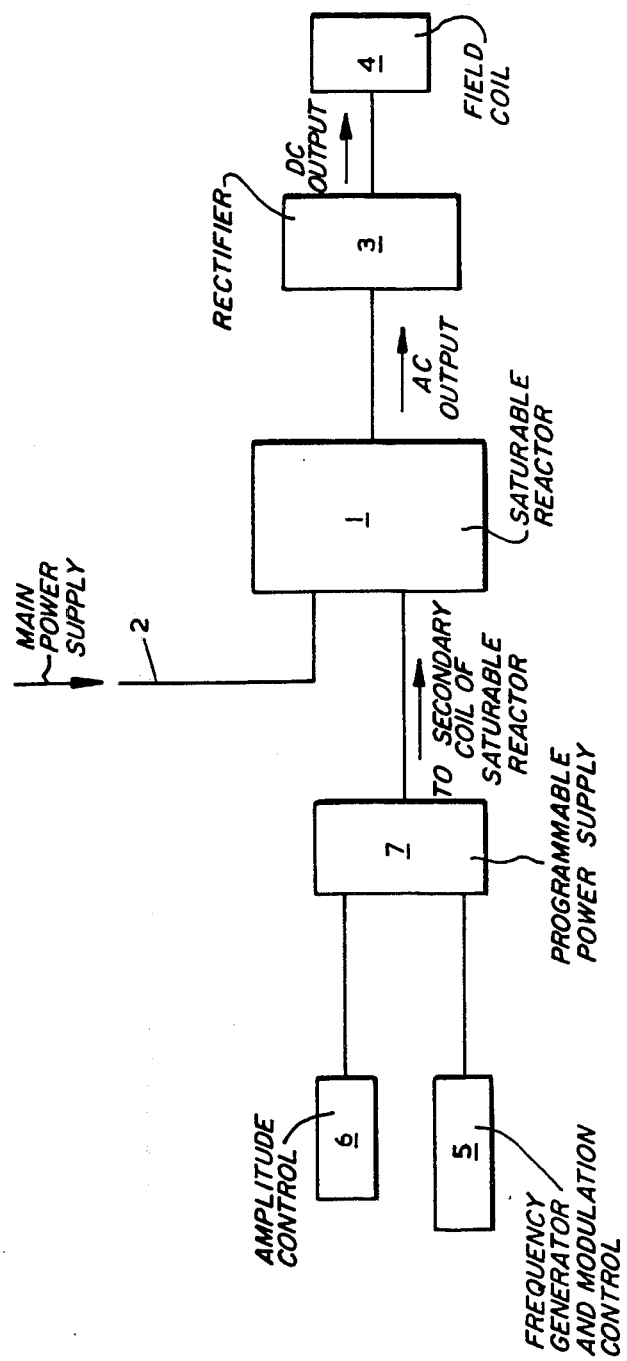

METHOD AND APPARATUS FOR CONTROLLING THE EROSION OF ARC PRODUCING ELECTRODES

The present invention relates to apparatus and process for prolonging the life of an electrode between which an arc is sustained.

In the operation of devices wherein an arc is sustained between electrodes over a prolonged period of time, for example in the devices known as plasma guns, the rate of penetration by erosion of the electrode(s) in the area on which the arc foot forms is extremely important. Where the device is used in a manufacturing process, for example for the continuous supply of a gas at high temperature, a too rapid rate of penetration results in an unacceptably high down time of the device and of the process. One example of a process in which an arc between electrodes is utilised in the heating of gases for subsequent use in a continuous chemical process is described in U.S. Pat. No. 3,501,262 wherein the hot gas provides the necessary temperature for the oxidation of metal halides in the vapour phase—particularly for the oxidation of titanium tetrachloride to pigmentary titanium dioxide.

One method of reducing the rate of penetration of an electrode(s) is by the provision around the electrode of a field coil, normally supplied with direct current, whereby the arc foot on the electrode is caused to rotate rapidly within the magnetic field produced by the field coil thus reducing the rate of penetration by erosion due to the arc. The improvement obtained by such a device has been found to be insufficient.

The concept of the use of a field coil to reduce the rate of penetration of the surface of an electrode has been carried further by the use of the device described and claimed in U.S. Pat. No. 3,828,223 wherein the field coil consists of a number of coils spaced along the electrode, some of which may be switched out, preferably sequentially; the power to these coils being diverted to the remaining coils. By this means not only is the arc foot rotated over the surface of the electrode but it is also moved longitudinally over the surface of the electrode within the magnetic field thereby again reducing the rate of penetration by erosion of the electrode. The frequency of switching out of a constituent coil is normally of the order of one coil per five days. Whereas such apparatus gives a lower rate of penetration of the electrode than does the earlier type of field coil, a greater prolongation of the life of the electrode is always desirable and it is an object of the present invention to obtain this.

Accordingly, the present invention is an apparatus for prolonging the life of at least one of the electrodes between which an arc is sustained comprising a field coil surrounding that part of the electrode whereon the arc foot is formed; a system for the supply to the field coil of direct current and a current oscillator, the output of the current oscillator and the direct current supply system being inter-connected in such a manner that the current to the field coil is oscillated at a frequency in the range $5 \times 10^{-1}$ to $1 \times 10^{-4}$ Hz.

The invention is also a process for prolonging the life of at least one of the electrodes between which an arc is sustained wherein sufficient magnetic flux is produced around the electrode by means of a field coil surrounding the electrode where the arc foot is located on the electrode to stabilise the arc foot by the supply of direct current and causing the direct current supply to the field coil to oscillate at a frequency in the range $5 \times 10^{-1}$ to $1 \times 10^{-4}$ Hz.

The field coil preferably consists of a number of constituent coils, placed side by side along the electrode, electrically inter-connected and wound in such a manner that the current flows through each coil in the same direction, thereby reinforcing the magnetic flux. The conducting material with which the coils are wound is preferably provided with a passage through the centre through which a fluid coolant, for example water at super-atmospheric pressure, can be passed. It is preferred that, in addition to being electrically connected, the constituent coils are also mechanically connected in such a manner that fluid coolant can pass through more than one constituent coil before being withdrawn. Field coils of this type are described, for example, in U.S. Pat. No. 3,828,223. A particularly suitable material for winding the field coil is copper tube of rectangular outer cross-section. Each turn of the coil is, of course, insulated from adjacent turns and the whole may be embedded in a suitable polymer to provide a compact and readily handleable device. The appropriate connections for power and coolant are provided on the surface of the field coil.

The field coil is preferably (but not necessarily) applied to a tubular electrode and is positioned by sliding the coil over the outside of the electrode until it surrounds that part of the electrode upon which the arc foot forms during operation of the device. The field coil is preferably applied to the cathode but may, if desired, be applied to the anode or, alternatively, field coils may be applied to both cathode and anode. Where tubular electrode(s) are provided to arc forms within the electrode, the arc foot being attached to a particular area inside the electrode, the exact position of which depends upon the conditions of operation of the device. In the absence of an effective field coil the position of the arc foot is likely to be unstable. The magnetic flux provided by the coil assists in stabilising the position of the arc foot within or upon the electrode and normally causes the position of the arc foot to rotate over the electrode surface.

The system for providing a direct current supply to the field coil may be any suitable system from which the output can be caused to oscillate at the desired frequency. Examples of such systems are an electrical series reactor; a saturable reactor (or any other system whereby the output may be varied rapidly by varying its inductance) or a thyristor control (also known as a silicon-controlled rectifier). In the series reactor or in the saturable reactor (or other variable inductance device) it is necessary to provide a rectifier between the reactor and the field coil to provide the required direct current supply. Where a thyristor control is used the conversion to direct current is normally effected within the thyristor control itself. One suitable form of series reactor is described in U.S. Patent Application Ser. No. 655,103.

The method of inter-connecting the oscillator to the DC supply to provide the required oscillations in the DC supply to the field coil depends upon the particular system chosen for the DC supply.

In the use of an electrical series reactor and rectifier the oscillation of the DC supply is normally obtained by the insertion of a variable transformer in the AC supply to the series reactor. The oscillator is connected to the variable transformer in such a manner that the AC voltage supply to the series reactor is caused to oscillate thereby causing the output from the series reactor and from the subsequent rectifier to the field coil to oscillate at the desired frequency.

A saturable reactor consists of coils wound upon cores of a magnetic material, for example of iron. The inductance of the coils is determined by the number of turns on each coil and on the magnetic state of the core. The magnetic state of the core is determined by the magnetic characteristics of the core material and by the magnitude of a DC magnetising current supplied to a second coil wound on the core of magnetic material. The inductance of the coils may therefore be controlled by varying the DC magnetising current, and in one method of carrying out the present invention the DC magnetising current is supplied and varied by the current oscillator.

It will be appreciated from the foregoing that the output from an electrical series reactor is controlled by varying the voltage input thereto whereas in the case of a saturable reactor the output is controlled by varying the inductance of the device; the voltage input remaining constant.

Where the DC supply system is a thyristor control, variation of the DC output is obtained by variation in the control signal to the thyristor; the output of the oscillator of the present invention being incorporated into the control signal supply system to provide the required variation in the output from the thyristor control.

The objective of the variation in the output of the DC supply system to the field coil by the current oscillator is to ensure that the DC supply to the field coil rises and falls as a regular wave motion over a short time scale and thus causes the arc foot to move rapidly backwards and forwards over an extended area of the electrode. It is preferred that the arc foot is also rotated over the surface of the electrode by means of the field coil although this is not an essential feature of the invention since it has been found that rapid reciprocation of the arc foot provided by the present invention gives a substantial prolongation of the life of the electrode when compared with previously used processes.

A suitable current oscillator is one wherein the current and voltage characteristics are compatible with the field coil current control system to be used. For example a saturable reactor may require an output from the current oscillator of, say, 60 amps and 50 volts to achieve the desired result whereas a thyristor unit may require a much smaller output, for example 1 amp and 1 volt.

It has been found that oscillation frequencies applied to the field coil below the claimed range do not acceptably reduce the rate of erosion of the electrodes whereas oscillating frequencies in excess of the claimed range do not permit the system, i.e. the field coil and its associated current supply equipment to react to provide an acceptably controlled movement of the arc over the surface of the electrode(s). It is preferred that the oscillating frequency applied to the field oil is one in the range $5 \times 10^{-1}$ to $1 \times 10^{-2}$ Hz.

The accompanying diagrammatic drawing shows one method of carrying out the process of the present invention wherein a conventional saturable reaction (1) is supplied by a main power supply (2), the output from the saturable reactor passing via a conventional rectifier (3) to the conventional field coil (4). An example of the field coil (4) may be found in U.S. Pat. No. 3,828,223 which is cited above. The purpose of the rectifier is, of course, to convert the AC output from the saturable reactor to a DC supply to the field coil.

The variation in the output of the saturable reactor at a frequency in the desired range and at the desired amplitude is achieved in this method by the provision of a combined frequency generator and modulation control (5); an amplitude control (6) and a programmable power supply (7) the output of which is utilised to vary the inductance of the saturable reactor as described earlier in this specification. The frequency generator and modulation control (5), the amplitude control (6) and the programmable power supply (7) are conventional elements which are commercially available. As set forth below, the frequency generator and modulation control (5) and the amplitude control (6) used in the present invention correspond to the "Synthesized Generator DSG1" made by Farnell Instruments, Ltd. of Wetherby, Yorshire, United Kingdom. An example of the programmable power supply (7) corresponds to the "Heavy Duty Power Supply" also made by Farnell Instruments, Ltd. Copies of publications showing these elements are included in the file wrapper.

In operation the frequency generator produces the oscillating current at the desired frequency (which may be varied by the modulation control) and this is supplied to a programmable power supply wherein the current (and voltage) at the output frequency from the frequency generator may be amplified to the required value to provide the necessary oscillation of the output to the field coil. The purpose of the amplitude control is to control the percentage variation, for example up to $\pm 60\%$ of the output at the required frequency. .

The following Examples provide an approximate comparison between the results obtained by the process described in the Example of U.S. Pat. No. 3,828,223 and that obtained by the process of the present invention.

EXAMPLE 1

(a) A plasma gun and field coil described in the Example of U.S. Pat. No. 3,828,223 was set up and operated as described in that Example. It was found that the maximum depth of penetration of the electrode by the arc foot was 0.6 mm per hundred hours of operation.

(b) A plasma gun similar to that described in the Example of U.S. Pat. No. 3,828,223 but having an unswitched field coil i.e. a field coil in which none of the constituent coils could be shorted out, and consisting of 10 coils was set up. The field coil was supplied with a current of 420 amps and this was varied within a value of $\pm 45\%$ at a frequency of $5 \times 10^{-1}$ Hz during operation of the plasma gun. The maximum depth of penetration over a period of 100 hours was found to be 0.45 mm.

The variation in current supply in (b) above was obtained by the control of a saturable reactor to which was applied the output from a Farnell, "Sythesized Generator DSG1", made by Farnell Instruments Limited of Wetherby, Yorkshire, United Kingdom. The output from this generator (60 volts 53 amps) was supplied to a secondary coil around the core of the saturable reactor, at the frequency noted above, thereby varying the output from the saturable reactor to the following rectifier and thus to the field coil which was supplied by the rectifier.

EXAMPLE 2

The process described in step (a) of Example 1 was operated at an increased arc current (of 600 amps). The maximum rate of penetration of the electrode was found to be 0.9 mm/100 hours operation under these conditions of operation.

When the process was operated as described in step (b) of Example 1 but at the increased arc current mentioned above the maximum rate of penetration was found to be only 0.3 mm/100 hours operation.

When the process was operated as in the previous paragraph but with a frequency of oscillation of the current to the field coil of $5 \times 10^{-3}$ Hz the maximum rate of penetration of the electrode was 0.7 mm/100 hours of operation.

What is claimed is:

1. Apparatus for prolonging the life of least one electrode of two or more electrodes between which an arc is sustained comprising:
    a field coil surrounding that part of the electrode whereon the arc foot is formed;
    a system for supplying direct current to the field coil; and
    a current oscillator, the output of the current oscillator and the direct current supply system being interconnected in such a manner that the current to the field coil can be oscillated at a frequency in the range $5 \times 10^{-1}$ to $1 \times 10^{-4}$ Hz.

2. Apparatus as claimed in claim 1 wherein the output of the current oscillator and the direct current supply system are interconnected in such a manner that the current to the field coil can be oscillated at a frequency in the range $5 \times 10^{-1}$ to $1 \times 10^{-2}$ Hz.

3. Apparatus as claimed in claim 1 wherein the system for supplying direct current to the field coil comprises an electrical series reactor and a rectifier.

4. Apparatus as claimed in claim 3 wherein the direct current supply system comprises an electrical series reactor and the output from the current oscillator is connected to a variable transformer in the power supply to the electrical series reactor.

5. Apparatus as claimed in claim 3 wherein the direct current supply system comprises a saturable reactor and the output from the current oscillator is connected to a secondary coil wound on the core of magnetic material in the reactor.

6. Apparatus as claimed in claim 1 wherein the system for the supply of direct current to the field coil comprises a thyristor.

7. Apparatus as claimed in claim 6 wherein the direct current supply system comprises a thyristor and the output from the current oscillator is connected into the control signal supply system to the thyristor.

8. Apparatus as claimed in claim 1 wherein the cathode is a tubular electrode and the field coil is placed around this electrode where the arc foot forms.

9. Apparatus as claimed in claim 1 wherein the system for supplying direct current to the field coil comprises a saturable reactor and a rectifier.

10. A process for prolonging the life of at least one of the electrodes between which an arc is sustained wherein sufficient magnetic flux is produced around the electrode by means of a field coil surrounding the electrode where the arc foot is located to stabilise the arc foot by the supply of direct current and thereafter causing the direct current supply to the field coil to oscillate at a frequency in the range $5 \times 10^{-1}$ to $1 \times 10^{-4}$ Hz.

11. A process as claimed in claim 10 wherein the direct current supply to the field coil is caused to oscillate at a frequency in the range $5 \times 10^{-1}$ to $1 \times 10^{-2}$ Hz.

12. A process as claimed in claim 10 wherein the direct current supply to the field coil is varied by up to ±60% at the required frequency.

* * * * *